(12) United States Patent
Stern et al.

(10) Patent No.: US 8,455,025 B2
(45) Date of Patent: Jun. 4, 2013

(54) EDIBLE PET CHEW MADE FROM A SINGLE INITIALLY MALLEABLE SHEET

(75) Inventors: Mark Stern, New York, NY (US); Peter B. Wheeler, Honolulu, HI (US)

(73) Assignee: Petmatrix LLC, Saddle Brook, NJ (US)

( * ) Notice: Subject to any disclaimer, the term of this patent is extended or adjusted under 35 U.S.C. 154(b) by 454 days.

(21) Appl. No.: 12/764,480

(22) Filed: Apr. 21, 2010

(65) Prior Publication Data

US 2011/0262587 A1    Oct. 27, 2011

(51) Int. Cl.
  *A23K 1/1846*  (2006.01)
  *A23K 1/18*  (2006.01)
  *A23K 1/00*  (2006.01)
  *A01K 11/00*  (2006.01)

(52) U.S. Cl.
  CPC .............. *A23K 1/1846* (2013.01); *A23K 1/003* (2013.01); *A01K 15/026* (2013.01); *Y10S 426/805* (2013.01)
  USPC .............. 426/72; 426/74; 426/615; 426/622; 426/623; 426/516; 426/805

(58) Field of Classification Search
  USPC .............. 426/72, 74, 805, 615, 622, 623, 516
  See application file for complete search history.

(56) References Cited

U.S. PATENT DOCUMENTS

| | | | |
|---|---|---|---|
| 3,851,084 A * | 11/1974 | Rossen et al. | 426/249 |
| 4,260,635 A | 4/1981 | Fisher | |
| 4,364,925 A | 12/1982 | Fisher | |
| 4,702,929 A | 10/1987 | Lehn et al. | |
| 4,771,733 A | 9/1988 | Axelrod | |
| 4,822,626 A | 4/1989 | Spanier et al. | |
| 4,868,002 A | 9/1989 | Scaglione et al. | |
| 4,921,714 A | 5/1990 | Matthews et al. | |
| 5,047,231 A | 9/1991 | Spanier et al. | |
| 5,407,661 A | 4/1995 | Simone et al. | |
| 5,485,809 A | 1/1996 | Carroll | |
| 5,673,653 A | 10/1997 | Sherrill | |
| 5,695,797 A | 12/1997 | Geromini et al. | |
| 6,110,521 A | 8/2000 | Axelrod | |
| 6,126,978 A | 10/2000 | Axelrod | |
| 6,238,715 B1 | 5/2001 | Baikie | |
| 6,274,182 B1 | 8/2001 | Axelrod et al. | |
| 6,277,420 B1 | 8/2001 | Andersen et al. | |
| 6,365,133 B1 | 4/2002 | Rich | |
| 6,584,938 B2 | 7/2003 | Sherrill et al. | |
| 6,586,027 B2 | 7/2003 | Axelrod et al. | |
| 6,672,252 B2 * | 1/2004 | Levin et al. | 119/709 |
| 6,725,809 B1 | 4/2004 | Olgin | |
| 6,799,536 B1 | 10/2004 | Jia et al. | |
| 6,815,000 B2 | 11/2004 | Kesler | |
| 6,840,196 B2 | 1/2005 | Kirch | |

(Continued)

OTHER PUBLICATIONS

International Search Report and the Written Opinion for International Appln. No. PCT/US2011/033359, International Filing Date—Apr. 21, 2011, Mailed—Jan. 2, 2012, pp. 9.

(Continued)

*Primary Examiner* — Chhaya Sayala
(74) *Attorney, Agent, or Firm* — Reising Ethington P.C.

(57) ABSTRACT

An edible pet chew has a single sheet of a hardened chewable material dimensioned large enough and thin enough to be initially malleable for flexing, folding or rolling into a final shape. The single sheet is shaped into a final shape by flexing, folding or rolling and then hardened.

22 Claims, 3 Drawing Sheets

U.S. PATENT DOCUMENTS

| | | |
|---|---|---|
| 6,886,496 B1 | 5/2005 | Brown |
| 6,886,497 B1 | 5/2005 | Hague |
| 6,895,900 B2 | 5/2005 | Hingst |
| 6,935,275 B2 | 8/2005 | Jia et al. |
| 7,025,020 B2 | 4/2006 | Brown |
| 7,082,894 B2 | 8/2006 | Sherrill et al. |
| 7,112,345 B1 * | 9/2006 | McHale et al. .................. 426/5 |
| 7,194,981 B2 | 3/2007 | Kirch et al. |
| 7,332,188 B2 | 2/2008 | Axelrod |
| 7,579,038 B1 | 8/2009 | Weinberg |
| 7,651,708 B2 | 1/2010 | Schlebusch et al. |
| 7,677,203 B2 | 3/2010 | Stern |
| 7,691,426 B2 | 4/2010 | Axelrod et al. |
| 7,722,911 B2 | 5/2010 | Liu et al. |
| 2005/0153040 A1 * | 7/2005 | Axelrod et al. .............. 426/516 |
| 2005/0271775 A1 * | 12/2005 | Kirch et al. .................. 426/104 |
| 2006/0121162 A1 | 6/2006 | Garrett |
| 2006/0188611 A1 | 8/2006 | Unlu et al. |
| 2006/0188632 A1 * | 8/2006 | Nie et al. ..................... 426/549 |
| 2007/0148104 A1 | 6/2007 | Goettert et al. |
| 2007/0193531 A1 | 8/2007 | Anderson et al. |
| 2008/0003270 A1 | 1/2008 | Garcia Martinez |
| 2008/0014311 A1 | 1/2008 | Tepper et al. |
| 2008/0075808 A1 | 3/2008 | Altemueller |
| 2008/0118606 A1 * | 5/2008 | Stern ............................... 426/92 |
| 2008/0118607 A1 | 5/2008 | Sandoval et al. |
| 2008/0145485 A1 | 6/2008 | Tepper et al. |
| 2008/0193607 A1 | 8/2008 | Tepper et al. |
| 2008/0248167 A1 | 10/2008 | McMindes et al. |
| 2009/0004338 A1 | 1/2009 | Anderson et al. |
| 2009/0110802 A1 | 4/2009 | Pibarot et al. |
| 2009/0235872 A1 | 9/2009 | Filipi et al. |
| 2009/0274800 A1 | 11/2009 | Assenmacher et al. |
| 2010/0003393 A1 | 1/2010 | Torney et al. |

OTHER PUBLICATIONS

Greenies Product Information—1999 (6 pages).

* cited by examiner

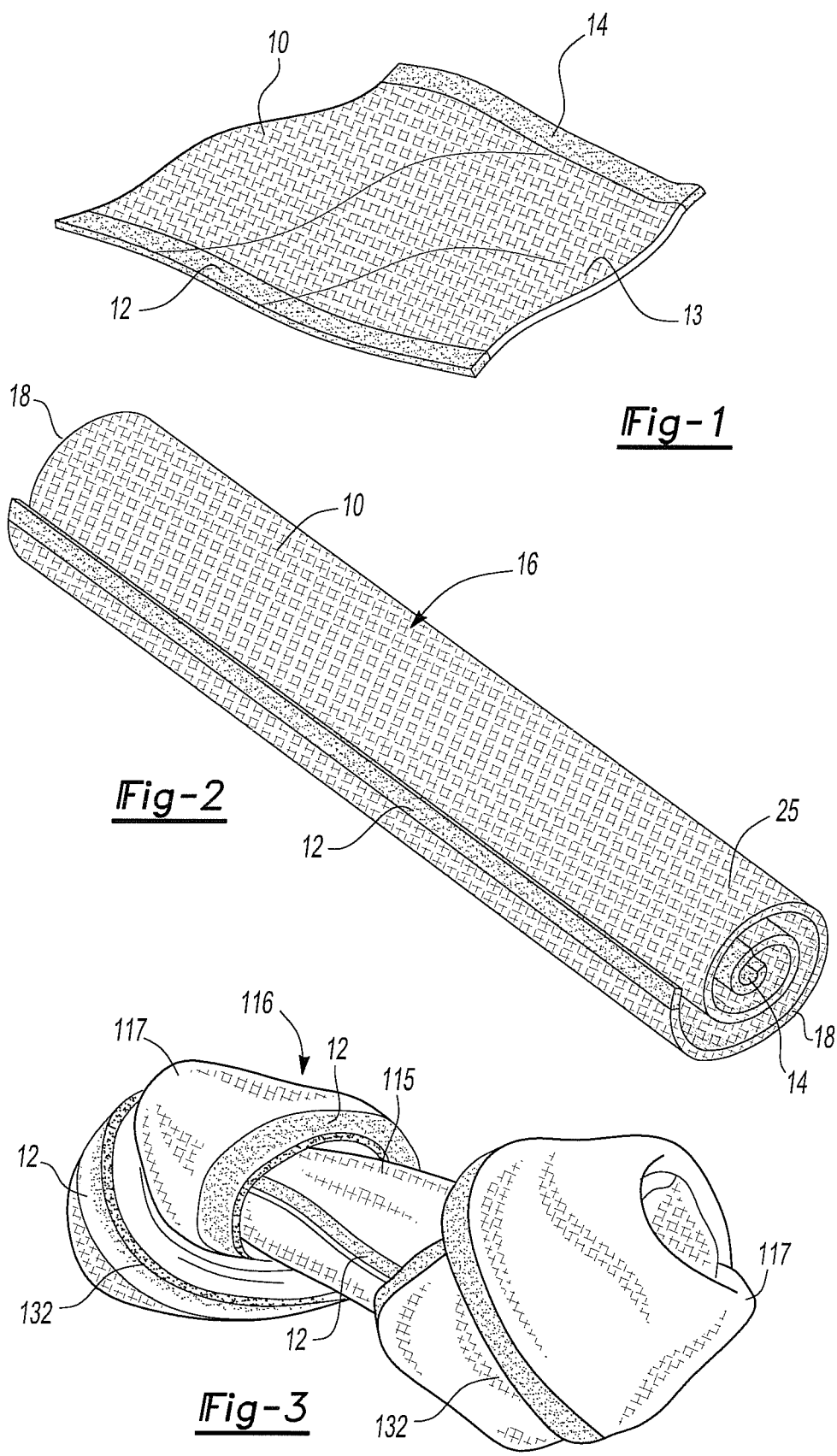

US 8,455,025 B2

EDIBLE PET CHEW MADE FROM A SINGLE INITIALLY MALLEABLE SHEET

TECHNICAL FIELD

The field of this invention relates to an edible pet chew.

BACKGROUND OF THE DISCLOSURE

A single visit to a pet supermarket makes it readily apparent that there is a wide selection of rawhide and other synthetic chew toys manufactured and shaped for dogs and other carnivorous pets to chew on. Pet owners believe chew toys are desirable for cleaning the teeth of dogs and other pets, providing for dental hygiene and resulting in better breath. The chew toys also distract the pet from chewing on other objects such as shoes or furniture.

Many of these chew toys have been made from synthetic materials such as plastic, for example, nylon or even rubber to provide a long lasting chew toy. These synthetic chew toys are indigestible and may pose a health risk if the dog bites off a portion and swallows it. Secondly, these toys may lose a dog's interest because the toy typically has no flavor or other chew incentive.

Other chew toys are made from rawhide. Rawhide also has no inherent flavor and thus may lose a dog's interest after only a short chew time. To overcome the lack of flavor and taste of rawhide, many manufacturers have attempted to add flavor to the pet chew by adding jerky, natural flavors or even pig hide in addition to the rawhide. Flavors may also be injected into the rawhide, marinated into the rawhide, wrapped in the rawhide or impregnated into the rawhide.

Many people are concerned that the manufacture of rawhide is a relatively unregulated industry. The origins of the rawhide may be unknown and the degree of contamination of the rawhide with antibiotics, insecticides or other detrimental elements for example, lead, may also be unknown. Furthermore, rawhide provides no nutritional benefits and is only slowly digestible if at all. These concerns, whether they all be true or unfounded, initiate a desire for dog and other pet owners to seek alternative ways to provide a chew treat for a pet without the use of rawhide.

One such pet chew recently placed on the market is a product made from a solid molded wheat based material with glycerin, gelatin, monoglycerides of edible fatty acid, and natural flavor. It also contains chlorophyll which is marketed to improve the dog's breath. This molded plant material composite is molded into an elongated shape with one end shaped like a toothbrush head and an opposite end shaped like an epiphysis i.e. end of a long bone.

It is also known to make a jerky-like material both in texture and taste from soy protein isolate and wheat starch formed into elongated strips. It is also known to provide an extruded composite for dry diets formed from emulsified meat and grain meal byproducts.

It is also popular to have a treat made from a layer of rawhide or composite with rawhide and a layer or sheet of jerky laid onto the rawhide layer, the layers are then wrapped together and knotted to provide a bone like appearance. However, these multiple layer and knotted pet chews are relatively expensive. The whole sheets of rawhide are prone to produce waste and the sheets of jerky are expensive. The assembly of the multiple sheets of rawhide and jerky is also difficult to automate and thus is relatively expensive.

What is needed is an improved edible pet chew that has a single sheet of hardened and chewable plant based material that is initially malleable for folding, rolling or flexing into a final shape.

SUMMARY OF THE DISCLOSURE

In accordance with one embodiment of the invention, an edible pet chew has a single sheet of hardened chewable material dimensioned large enough and thin enough to be initially malleable for flexing, folding or rolling into a final shape. The single sheet is shaped by flexing, folding or rolling before hardening into the final shape. Preferably, the single sheet is a hardened chewable substantially plant based material.

In one embodiment, the single sheet of plant based material is a substantially starch composition. In one embodiment, the single sheet has chunks of the cured or dried animal flesh material embedded therein. Preferably, the plant based material is extruded to form the single sheet. The single sheet is preferably rolled and knotted at each end to form the final shape of the pet chew.

In one embodiment, the single sheet is rolled to form a cylindrical roll and has a first edge section having a different appearance or flavor from a mid-section of the single sheet. The first edge section is positioned at an outer edge of the cylindrical roll.

Preferably, the single sheet has first and second co-extruded areas with a different appearance or flavor from each other.

In accordance with another aspect of the invention, an edible pet chew has a co-extruded single sheet of hardened chewable material dimensioned large enough and thin enough to be initially malleable for flexing, folding or rolling into a final shape. A first section of the co-extruded single sheet has a first appearance or first flavor. A second section of the co-extruded sheet has a second appearance or second flavor. The single sheet is shaped by flexing, folding or rolling before hardening into its final shape. In one embodiment, the first and second sections are respective first and second layers of the co-extruded single sheet.

BRIEF DESCRIPTION OF THE DRAWINGS

Reference now is made to the accompanying drawings in which:

FIG. 1 is a perspective view showing a single sheet of a plant based starch material forming an edible pet chew in accordance with one embodiment of the invention;

FIG. 2 is a perspective view of one embodiment of the edible pet chew using the single sheet shown in FIG. 1;

FIG. 3 shows another embodiment having two knotted ends to simulate the epiphyses of a bone with a diaphysis in the middle using the single sheet shown in FIG. 1;

DETAILED DESCRIPTION OF THE PREFERRED EMBODIMENT

Figure 4:
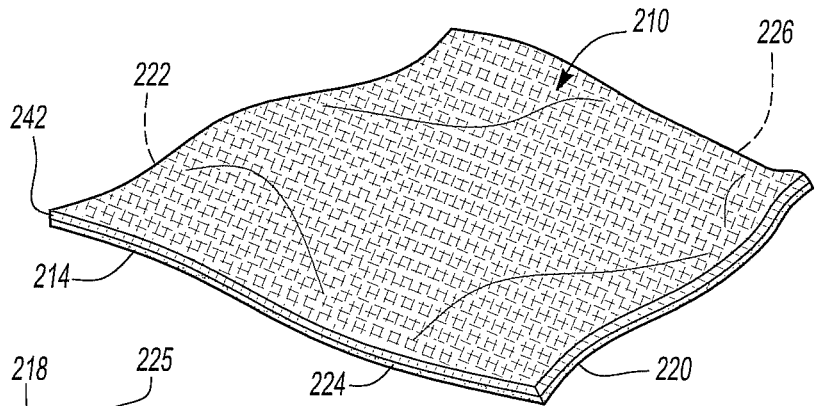
FIG. 4 is a perspective view showing a single co-extruded sheet of a plant based starch material forming an edible pet chew in accordance with another embodiment of the invention.

FIG. 1 illustrates a single sheet 10 of a plant based composition, for example a wheat starch mixed with a gelatin or other binder for example glycerin. The single sheet 10 can be formed by extrusion, rolling, pressing or other process so that it is flat and thin. Its thickness preferably ranges from 2 mm to 5 mm. The sheet has width and length dimensions preferably ranging from 10 cm to 20 cm each. The term "plant based" means material having substantially over 50% of plant material. The gelatin may be a small percentage by weight, for example 5%, to provide sufficient malleability, moldability, extrudability, and formability as set forth in further detail below. Other plant materials may be substituted for the above mentioned materials as long as the material is a cohesive material that can be rolled and formed in a malleable state and eventually hardened by heat or drying into a hard but chewable matter for use by a carnivorous pet.

The single sheet 10 has a first edge section 12 and a second edge section 14 that may have a visually distinctive appearance, for example, a different color or texture from the remaining mid-section 13 of the sheet 10. In addition or alternatively, the edges 12, 14 may have a different flavor from the remaining mid-section 13. In one embodiment, the edge sections 12, 14 may be colored red to simulate a beef jerky. The edge sections 12, 14 may also have a meat or other attractive scent or flavor infused or otherwise added to them. The flavor additive may be either artificial or real.

The single sheet 10 as shown in FIG. 1 is then rolled up as shown in FIG. 2 to form a cylinder roll shaped edible pet chew 16. The pet chew 16 has end sections 25 that appear from an end view to have a spiral shape 18. The edge section 14 is near the center or interior of the pet chew 16. The edge section 12 of single sheet 10 is positioned at the exterior side of pet chew 16 and provides an illusion that a piece of beef jerky extends out of a roll. The cylinder shaped pet chew 16 is then allowed to dry to harden the composition forming the single sheet 10.

As shown in FIG. 3, an alternate shaped pet chew 116 can be formed to more closely simulate an elongated bone with an elongated middle section 115 also referred to as a diaphysis and opposite simulated epiphyses 117 formed by knots 132 tied at each end section 25 of the cylinder shaped assembly 16 as shown in FIG. 2 before it's hardened. The alternately shaped edible pet chew 116 still has the same flavored or colored edge section 12, positioned at an outer portion of the epiphyses 117 as well as at the exterior side of the elongated middle section 115 to stimulate a beef jerky strip extending out of the bone. Edge section 14 is positioned to the interior of the pet chew 116 but can be detected by the dog's keen sense of smell to maintain the dog's interest in the pet chew.

Figure 5:
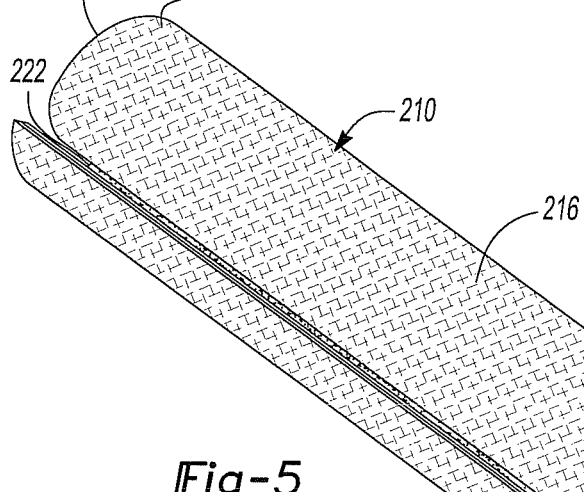
FIG. 5 is a perspective view of an embodiment of the edible pet chew using the single sheet shown in FIG. 4.
Figure 6:
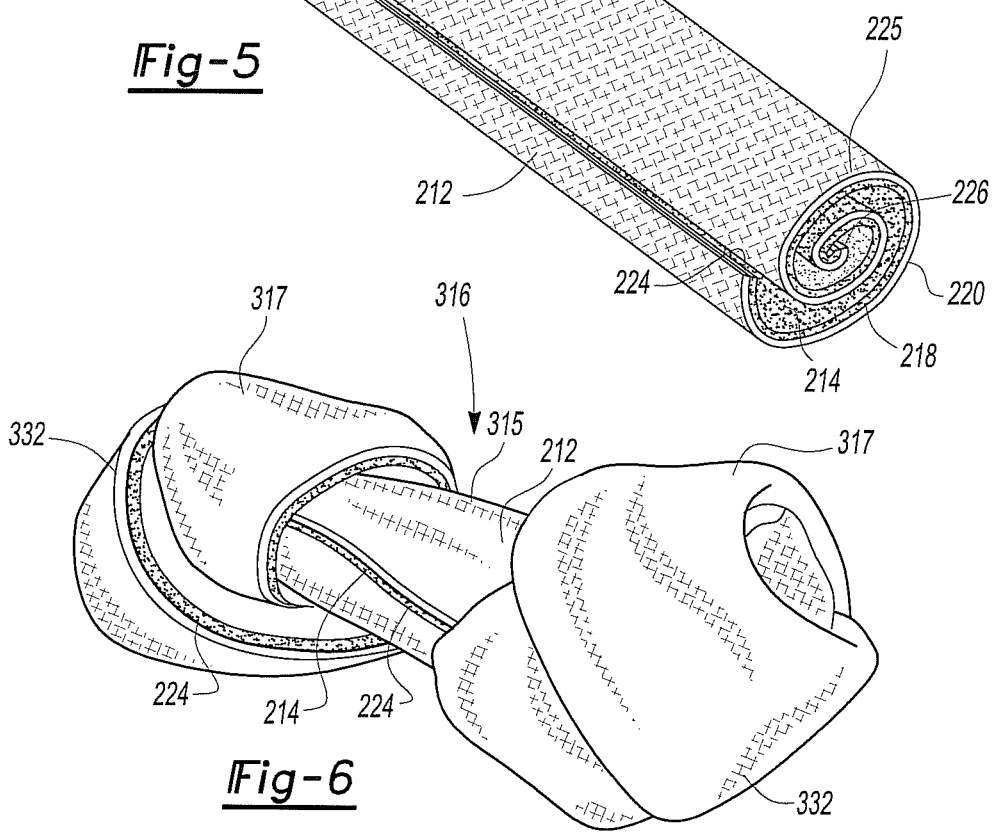
FIG. 6 shows another embodiment having two knotted ends to simulate the epiphyses of a bone with a diaphysis in the middle using the single sheet shown in FIG. 4.

Another alternate embodiment of the sheet for making a pet chew is shown in FIGS. 4-6 which show a single co-extruded sheet 210. The co-extruded sheet has two layers, one layer 214 has a different flavor or a visually distinctive appearance for example, a different color or texture from the other layer 212 of single sheet 210. In one embodiment, the layer 214 may be colored red to simulate a beef jerky and infused with a meat flavor. The flavor additive may again be either artificial or real. The co-extruded sheet can be a square or rectangular shape with edges 220, 222, 224 and 226.

The single sheet 210 as shown in FIG. 4 is then rolled up as shown in FIG. 5 to form a cylinder shaped edible pet chew 216. The pet chew 216 has end sections 225 that appear from an end view to have a spiral shape 218. The sheet 210 is rolled such that the layer 214 is considered the inner layer. The layer 212 of sheet 210 is positioned at the exterior side of the rolled pet chew 216. Edges 220, 222, 224, and 226 of layer 214 are visible after the rolled pet chew 216 is formed. The edges 220, 222, 224, and 226 of layer 214 form the illusion of beef jerky rolled into the rolled pet chew 216. The cylinder shaped pet chew 216 is then allowed to dry to harden the composition forming the single sheet 210.

As shown in FIG. 6, an alternate shaped pet chew 316 can be formed to more closely simulate an elongated bone with an elongated middle section 315 also referred to as a diaphysis and opposite simulated epiphyses 317 formed by knots 332 tied at each end section 225 of the cylinder shaped assembly 216 as shown in FIG. 5 before it's hardened. The alternately shaped edible pet chew 316 has the flavored, textured or colored layer 214 with the edge 224 of layer 214 exposed at the epiphyses 317 as well as at the elongated middle section 315.

Figure 7:
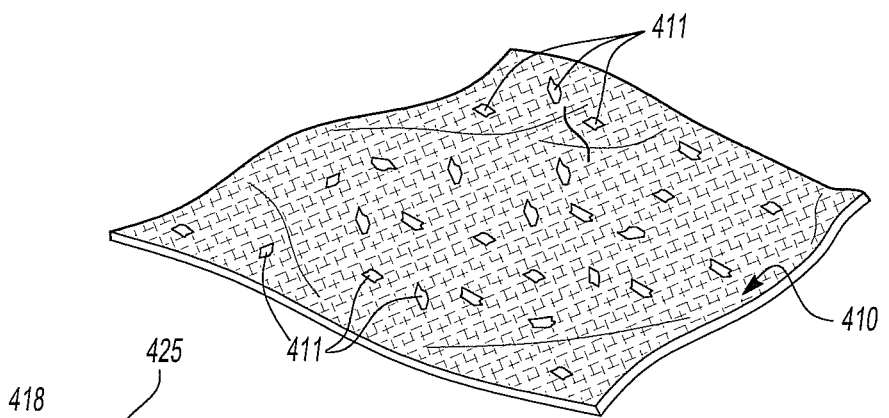
FIG. 7 is a perspective view showing a single sheet of a plant based starch material with embedded chunks of meat interspersed throughout forming an edible pet chew in accordance with another embodiment of the invention.
Figure 8:
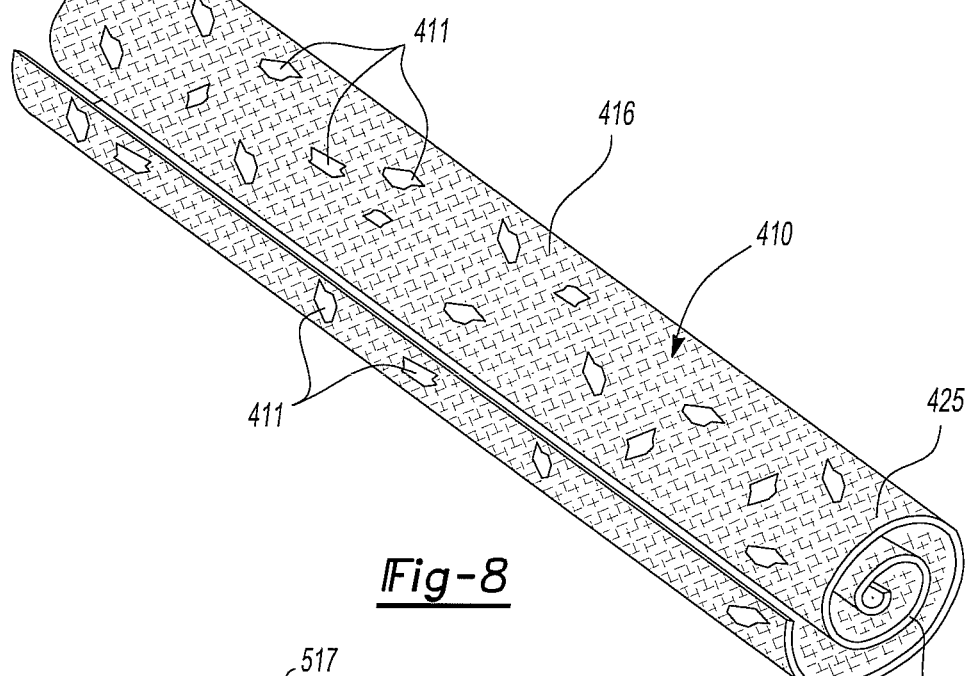
FIG. 8 is a perspective view of an embodiment of the edible pet chew using the single sheet shown in FIG. 7.
Figure 9:
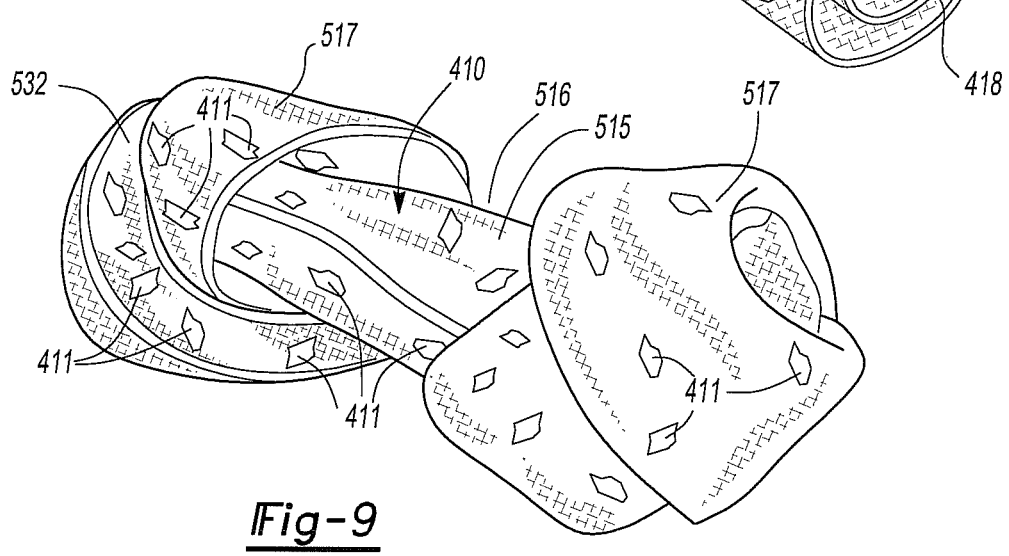
FIG. 9 shows another embodiment having two knotted ends to simulate the epiphyses of a bone with a diaphysis in the middle using the single sheet shown in FIG. 7.

Another alternate embodiment of a single sheet 410 for making a pet chew is shown in FIGS. 7-9 which shows a single extruded sheet 410 with flavor chunks 411 of dried meat or other flavored food stuff embedded therein. The chunks 411 are preferably visible from either side of the single sheet 410. The single sheet 410 as shown in FIG. 7 is then rolled up as shown in FIG. 8 to form a cylinder shaped edible pet chew 416. The pet chew 416 has rolled end sections 425 that appear from an end view to have a spiral shape 418. The cylinder shaped pet chew 416 is then allowed to dry to harden the composition forming the single sheet 410.

As shown in FIG. 9, an alternate shaped pet chew 516 can be formed to more closely simulate an elongated bone with an elongated middle section 515 also referred to as a diaphysis and opposite simulated epiphyses 517 formed by knots 532 tied at each end 425 of the cylinder shaped assembly 416 as shown in FIG. 8 before it's hardened. The alternately shaped edible pet chew 516 has the chunks 411 embedded in the sheet 410 and visible at an outer portion of the epiphyses 517 as well as therebetween at the exterior side of the elongated middle section 515. Depending on the desired size of the chunks 411, the chunks 411 may either be extruded with the plant based composition or rolled into the plant based composition after the plant based composition is extruded.

In this fashion, by providing an edible pet chew with a hardened and chewable or casing made from a plant based material instead of rawhide, one avoids all the concerns, whether real or perceived, regarding the use of rawhide. Secondly, the plant based material has inherent nutrition and may be easily provided with added nutritional ingredients such as vitamins and minerals if desired. While a plant based starch is preferred it is foreseen that a plant based protein also may be used as a major component of the single sheet.

Furthermore, the second sheet edge section or coextruded second layer of the single sheet can be infused with flavor to provide a taste incentive for the pet to continue to chew and not lose interest in the pet chew after only a short period of time.

Other variations and modifications are possible without departing from the scope and spirit of the present invention as defined by the appended claims.

The embodiments in which an exclusive property or privilege is claimed are defined as follows:

1. An edible pet chew consisting of:
a single sheet of a hardened chewable animal hide free material dimensioned large enough and thin enough to be initially malleable for flexing, folding or rolling into a final shape; and
said single sheet shaped by flexing, folding or rolling before hardening into said final shape.

2. An edible pet chew as defined in claim 1 wherein:
said single sheet is a hardened chewable substantially plant based material.

3. An edible pet chew as defined in claim 2 wherein:
said single sheet of plant based material is a substantially starch composition.

4. An edible pet chew as defined in claim 3 wherein:
said single sheet is made from extruded plant based material.

5. An edible pet chew as defined in claim 4 wherein:
said single sheet is rolled and knotted at each end to form the final shape of said pet chew.

6. An edible pet chew as defined in claim 2 wherein:
said single sheet is rolled to form a cylindrical roll;
said single sheet has a first edge section having a different appearance or flavor from a mid-section of said single sheet; and
said first edge section is positioned at an outer edge of said cylindrical roll.

7. An edible pet chew as defined in claim 6 wherein:
said single sheet is made from extruded plant based material.

8. An edible pet chew as defined in claim 7 wherein:
said single sheet is rolled and knotted at each end to form the final shape of said pet chew.

9. An edible pet chew as defined in claim 6 wherein:
said single sheet has a second edge section having a different appearance or flavor from a mid-section of said single sheet;
said second edge section is positioned at an interior portion of said formed pet chew.

10. An edible pet chew as defined in claim 9 wherein:
said single sheet is made from extruded plant based material.

11. An edible pet chew as defined in claim 10 wherein:
said single sheet is rolled and knotted at each end to form the final shape of said pet chew.

12. An edible pet chew as defined in claim 11 wherein:
said single sheet of plant based material is a substantially starch composition.

13. An edible pet chew as defined in claim 2 wherein:
said single sheet has chunks of flavored material embedded therein.

14. An edible pet chew as defined in claim 2 wherein:
said single sheet is rolled and knotted at each end to form the final shape of said pet chew.

15. An edible pet chew as defined in claim 2 wherein:
said single sheet has co-extruded first and second areas with a different appearance or flavor from each other.

16. An edible pet chew as defined in claim 5 wherein:
said single sheet is made from extruded plant based material.

17. An edible pet chew as defined in claim 16 wherein:
said single sheet is rolled and knotted at each end to form the final shape of said pet chew.

18. An edible pet chew as defined in claim 17 wherein:
said single sheet of plant based material is a substantially starch composition.

19. An edible pet chew consisting of:
a co-extruded single sheet of hardened chewable material dimensioned large enough and thin enough to be initially malleable for flexing, folding or rolling into a final shape;
a first section of said co-extruded single sheet having a first appearance or first flavor;
a second section of said co-extruded sheet having a second appearance or second flavor; and
said single sheet being shaped by flexing, folding or rolling before hardening into said final shape.

20. An edible pet chew as defined in claim 19 wherein:
said first and second sections are respective first and second layers of said co-extruded single sheet.

21. An edible pet chew as defined in claim 20 wherein:
said single sheet is a hardened chewable substantially plant based material.

22. An edible pet chew as defined in claim 21 wherein:
said single sheet is a substantially starch composition.

* * * * *